United States Patent [19]

Mouritzen et al.

[11] Patent Number: 5,293,986
[45] Date of Patent: Mar. 15, 1994

[54] MATERIALS HANDLING APPARATUS

[75] Inventors: Digby H. Mouritzen, La Lucia; Kenneth H. Mouritzen, Umhlanga Rocks, both of South Africa; Glenn L. Mouritzen, Arlington, Va.

[73] Assignee: Greystones Enterprises Limited, Durban, South Africa

[21] Appl. No.: 984,484

[22] Filed: Dec. 2, 1992

[30] Foreign Application Priority Data

Jul. 8, 1992 [ZA] South Africa ............. 92/5097

[51] Int. Cl.⁵ .............................. B65G 43/10
[52] U.S. Cl. ............................ 198/575; 198/303
[58] Field of Search ............... 198/301, 303, 572, 573, 198/575, 577

[56] References Cited

U.S. PATENT DOCUMENTS

| | | | |
|---|---|---|---|
| 2,510,163 | 6/1950 | Wood | 198/575 |
| 3,231,064 | 1/1966 | Towles | 198/303 |
| 3,361,248 | 1/1968 | Daymon | 198/303 |
| 4,236,631 | 12/1980 | Bowen et al. | 198/301 |
| 5,058,727 | 10/1991 | Jahns et al. | 198/575 |

Primary Examiner—Joseph E. Valenza
Attorney, Agent, or Firm—Killworth, Gottman, Hagan & Schaeff

[57] ABSTRACT

A conveyor system comprises a series of mobile conveyors arranged end-to-end, each mobile conveyor including an inclined belt, the material being conveyed being lifted by the belt of each conveyor in turn and discharged over the upper end of the belt onto the lower end of the belt of the next conveyor. The belts are driven by electric motors. A downstream conveyor of the series constitutes a master conveyor which is connected to a source of electrical power. Each upstream conveyor in the series is a slave conveyor, the first slave conveyor receiving power from the master conveyor and each subsequent slave conveyor receiving power from the slave conveyor(s) upstream thereof. The slave conveyors receive power at timed intervals so that the conveyor system starts in sequence from the downstream master conveyor. Safety means are provided for switching-off all the conveyors that are upstream of the conveyor that is disabled in an emergency.

10 Claims, 7 Drawing Sheets

MATERIALS HANDLING APPARATUS

FIELD OF THE INVENTION

This invention relates to conveyor systems.

BACKGROUND TO THE INVENTION

Conveyor systems are known which comprise a series of mobile conveyors. Each mobile conveyor has an inclined belt or the like. The material being conveyed is lifted by each conveyor in turn and dumped from its upper end onto the next conveyor of the series.

The main advantage of such systems is that they are flexible in operation. For example, if in a harbour a ship carrying grain must be off-loaded at a quay not usually used for that purpose, mobile conveyors can be strung out from the ship to the storage place. As soon as the ship is unloaded, the conveyors can be taken away for use elsewhere. Fixed conveyor systems on the other hand tend to be inflexible. They can convey material from a fixed loading point to a fixed discharge point but cannot be moved to cater for unexpected materials handling requirements.

Known conveyor systems are electrically driven, each mobile conveyor having its own electric motor. Power cables are run from the motors to one or more supply and control points. Often there is a single supply and control point and a multitude of cables running from it to the motors of the mobile conveyors. The multitude of cables adds to the cost of the system. Furthermore the large number of cables that have to be run from the control point to the motors form obstructions and potential danger points.

Control of all the conveyor motors is exercised from the single supply and control point. Hence, in an emergency, someone must reach or get a message to the single supply and control point to get the system switched-off.

OBJECTS OF THE INVENTION

The main object of the invention is to provide a conveyor system in which the conveyors of the system are supplied in series from a single power inlet connection.

Another object of the present invention is to provide a conveyor system in which shutting down one conveyor of the system shuts down all the conveyors upstream of it.

Another object of the present invention is to provide a conveyor system in which the conveyors upstream of the last conveyor of the system start in sequence after the last conveyor has been started.

BRIEF DESCRIPTION OF THE INVENTION

According to one aspect of the present invention there is provided a conveyor system including first and second conveyors, each conveyor including a conveyor belt and an electric motor for driving the belt, said first conveyor having a power inlet for connecting said motor of said first conveyor to a power supply and a power outlet connected to a power inlet of the second conveyor whereby power reaches the motor of the second conveyor through the power inlet and power outlet of the first conveyor.

Said first conveyor can comprise a timer which commences a timing sequence when power is supplied to said power inlet of said first conveyor and power connecting means which closes at the end of said timing sequence to supply power to said motor of said first conveyor and to said power outlet of said first conveyor.

Preferably, said power connecting means of said first conveyor comprises a first power connecting means between said power inlet and said motor of said first conveyor and a second power connecting means between said power inlet and said power outlet of said first conveyor.

The first conveyor preferably includes means for disabling said first power connecting means independently of said second power connecting means. Further means for opening simultaneously both said power connecting means can be provided thereby to stop said motor of the first conveyor and to interrupt the power supply to said power outlet of said first conveyor.

Each of said means is preferably a contactor.

Desirably means are provided for preventing power reaching said power outlet of said first conveyor unless the power inlet of said second conveyor is connected to said power outlet of said first conveyor.

The second conveyor can be identical to the first conveyor. To enable material to be conveyed over the requisite distance, the system can include said first conveyor, said second conveyor and a plurality of further second conveyors, each of which has a power inlet thereof connected to a power outlet of one of the second conveyors.

The last of the second conveyors of said plurality can be connected to a further first conveyor which itself has a power inlet for connection to said power supply, the power outlet of said last of said second conveyors being connected to said further first conveyor by a link which when in place completes the circuit from the power inlet of said further first conveyor to the timer thereof only when power reaches said power outlet of said last of said second conveyors.

Said link can include contacts which are in said circuit when said link is in position and which contacts close when power reaches said power outlet of said last of the second conveyors.

Said apparatus can further include a vacuum system for lifting fluent material and discharging it onto the upstream end of the series of conveyors, power to said vacuum system being supplied through a first conveyor or through a first conveyor and at least one second conveyor.

The apparatus can further include a hopper with a vibrator driven by an electric motor, said motor receiving its power through a first conveyor or through a first conveyor and at least one second conveyor.

According to a further aspect of the present invention there is provided a conveyor system including a first conveyor and a plurality of second conveyors, each conveyor including a conveyor belt and an electric motor for driving the belt, said first conveyor having a power inlet for connecting said motor of said first conveyor to a power supply and also having a power outlet, each second conveyor having a power inlet and a power outlet, said power inlet of the first of said second conveyors in the system being connected to said power outlet of said first conveyor and the power inlets and outlets of said second conveyors being connected to one another so that power is supplied to all said second conveyors through said first conveyor, each of said conveyors having a first power connecting means between the power inlet thereof and the motor thereof and a second power connecting means between the power inlet thereof and the power outlet thereof, and means for disabling said first power connecting means independently of said second power connecting means whereby any conveyor can be stopped without interrupting power supply to the other conveyors of the system.

BRIEF DESCRIPTION OF THE DRAWINGS

For a better understanding of the present invention, and to show how the same may be carried into effect, reference will now be made, by way of example, to the accompanying drawings, in which.

DETAILED DESCRIPTION OF THE DRAWINGS

Figure 1:
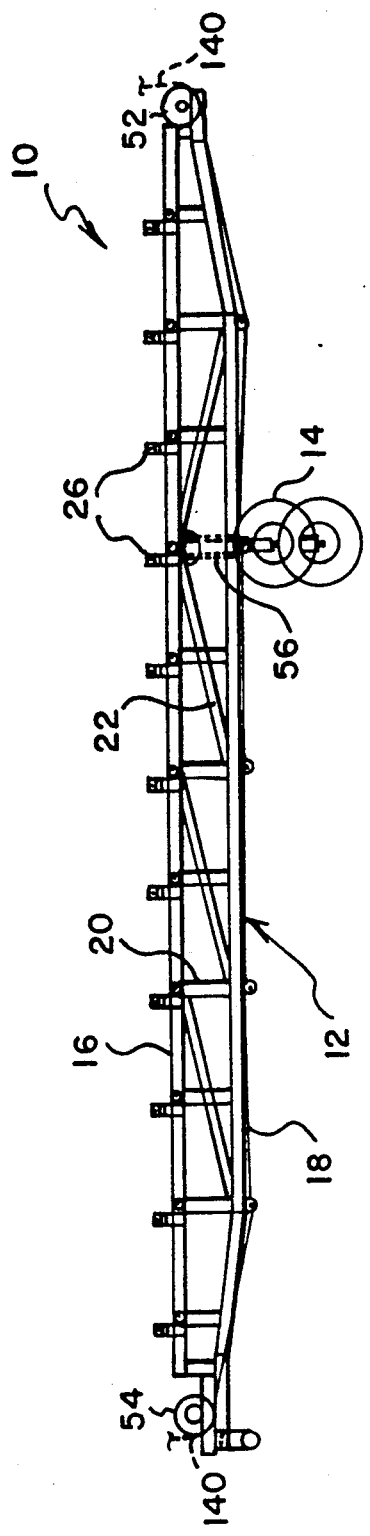
FIG. 1 is a side elevation of a mobile conveyor.
Figure 2:
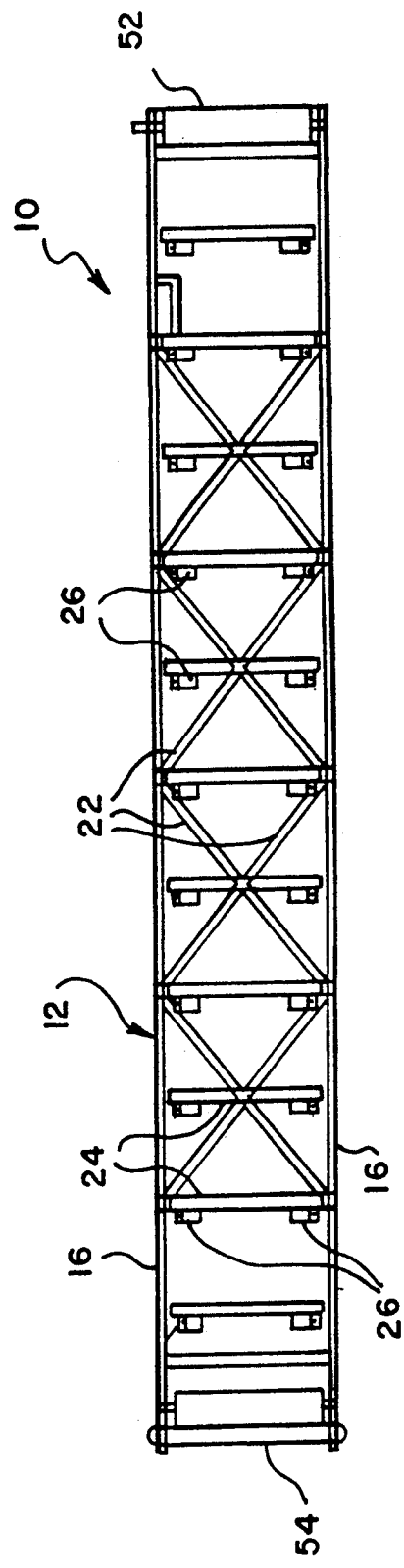
FIG. 2 is a top plan view of the conveyor of FIG. 1.

The mobile conveyor illustrated in FIGS. 1 and 2 is generally designated 10 and comprises an elongate frame 12, which is supported by a pair of wheels 14 located approximately one third of the way along the frame 12 from the end of the mobile conveyor which, in use, is the off-loading end. The wheels 14 are not shown in FIG. 2. The frame 12 comprises a pair of horizontally spaced upper frame members 16, a pair of horizontally spaced lower frame members 18, vertical struts 20 connecting the upper frame members 16 to the lower frame members 18, and angled braces 22, each of which connects between an upper frame member on one side of the frame 12 and a lower frame member on the other side of the frame 12.

Spanning between the upper frame members 16 there is a plurality of belt supporting idler rollers designated 24 and, at each end of each roller 24, there is a belt shaping idler roller 26.

Figure 4:
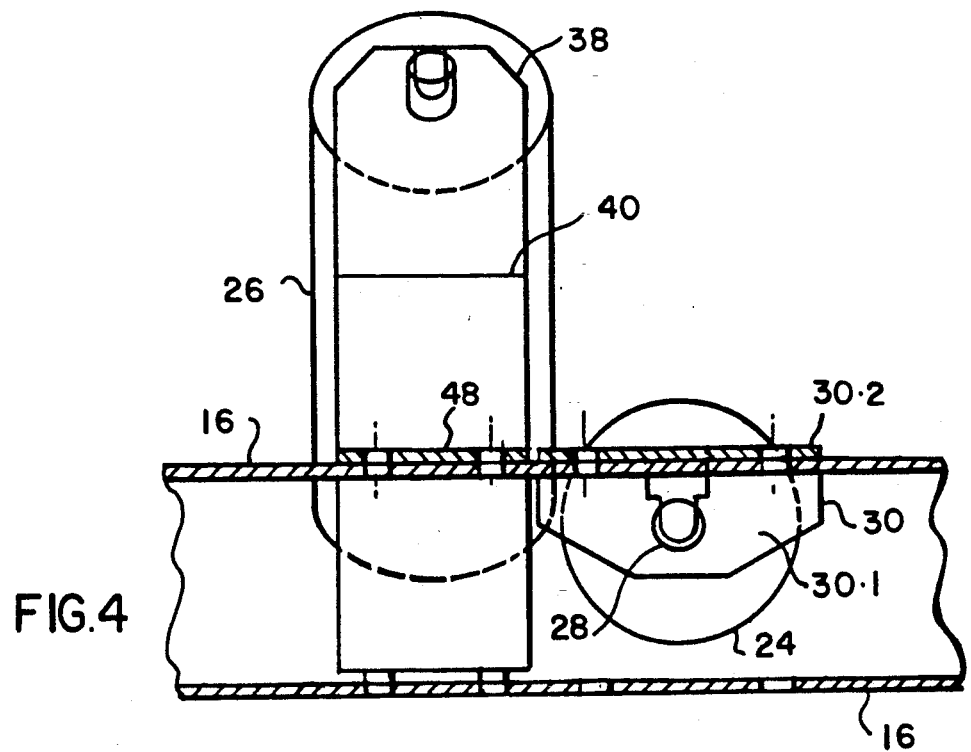
FIG. 4 is a section on the line IV—IV of FIG. 3.
Figure 3:
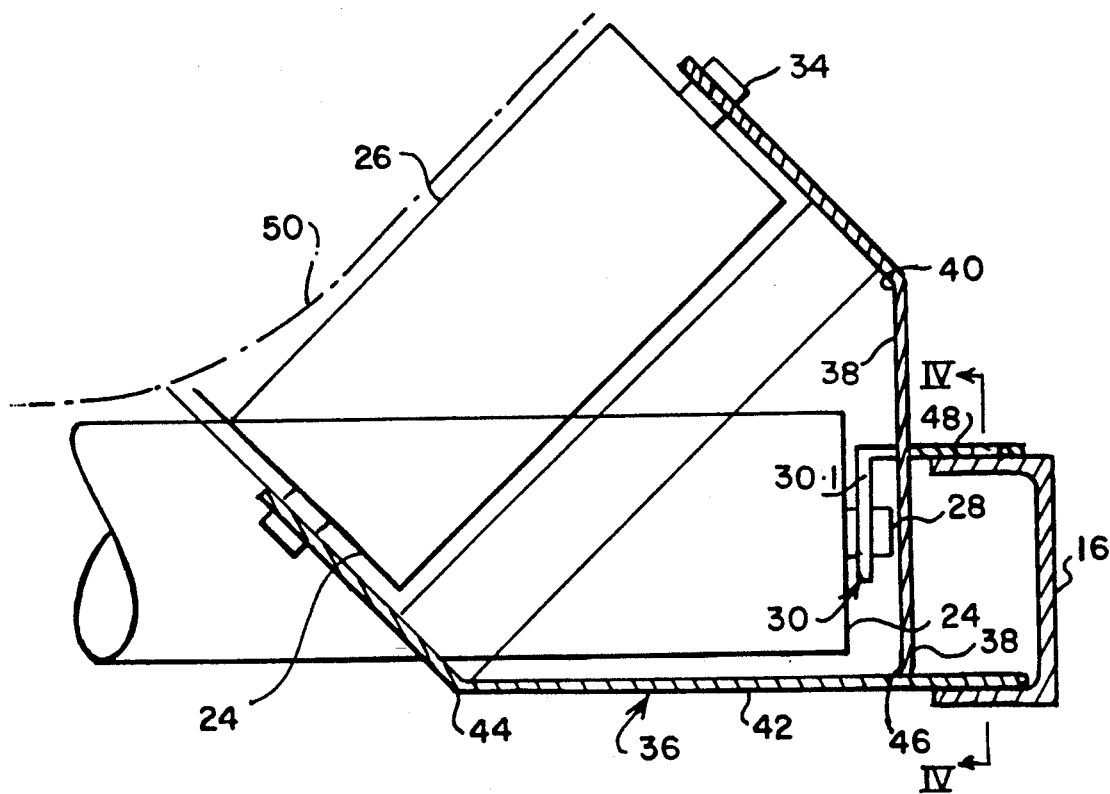
FIG. 3 is a side elevation of a roller assembly.

Referring now to FIGS. 3 and 4, each roller 24 has each end of its shaft 28 suitably mounted in a bearing carried by the vertical web 30.1 of an angle bracket 30. The horizontal web 30.2 of each bracket 30 is secured by bolts (the centre lines of which are shown at 32 in FIG. 4) to the upper flange of the upper frame member 16. The vertical portion of the member 16 has been omitted from FIG. 4 so that what would otherwise be hidden detail can be illustrated.

Each belt shaping roller 26 has the end of its shaft 34 mounted in suitable bearings carried by a bracket generally designated 36. The bracket 36 comprises an upper plate 38 with a bend therein at 40. The bracket further comprises a lower plate 42 with a bend therein at 44. The plates 38 and 42 are welded together at 46. The part of the plate 42 which extends beyond the weld 46 (to the right as viewed in FIG. 3), is bolted to the lower flange of the upper frame member 16. A further plate 48 is welded to and extends horizontally from the plate 38, the plate 48 being bolted to the upper flange of the member 16. The position occupied by the belt (designated 50) is shown in chain dotted lines in FIG. 3.

At the off-feed end of the mobile conveyor there is an idler head roller 52 and at the load receiving end of the mobile conveyor there is a driven tail roller 54. The drive means for the roller 54 will be described in more detail hereinafter.

The wheels 14 are mounted at the lower ends of adjustable legs 56. Each leg comprises an inner telescopic member on which the wheel 14 is mounted and an outer telescopic member which secured to the frame 12, The telescopic members are bolted to one another. Once the bolts have been removed, the two members forming the leg can be adjusted with respect to one another, thereby to vary the length of the leg and hence the angle of inclination of the frame 12 (see FIG. 9). Each leg further includes means for making small adjustments to the leg length. This enables one side of the frame 12 to be lifted or lowered with respect to the other for the purpose of levelling the upper run of the belt 50 when the mobile conveyor is standing on uneven ground. The legs 56 can be of the type which are found on road trailers and which are used to support the trailer when it is detached from a towing horse.

Figure 5:
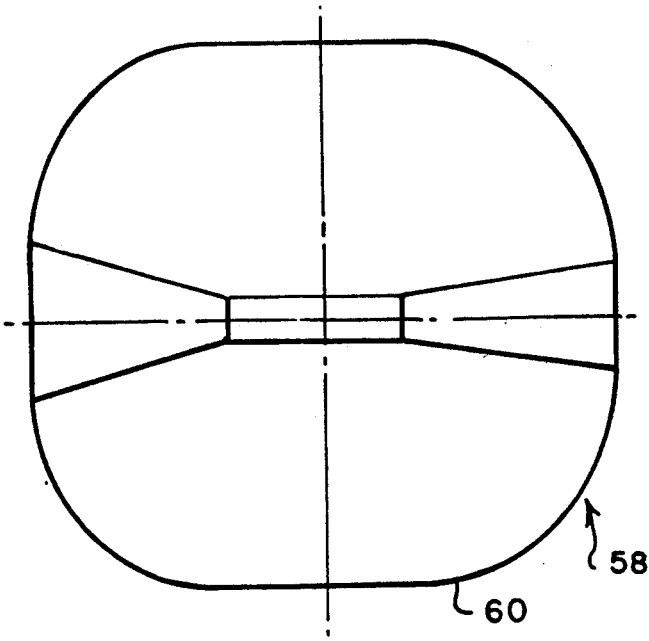
FIGS. 5, 6 and 7 are respectively a top plan view, a front elevation and a side elevation of a hopper.
Figure 6:
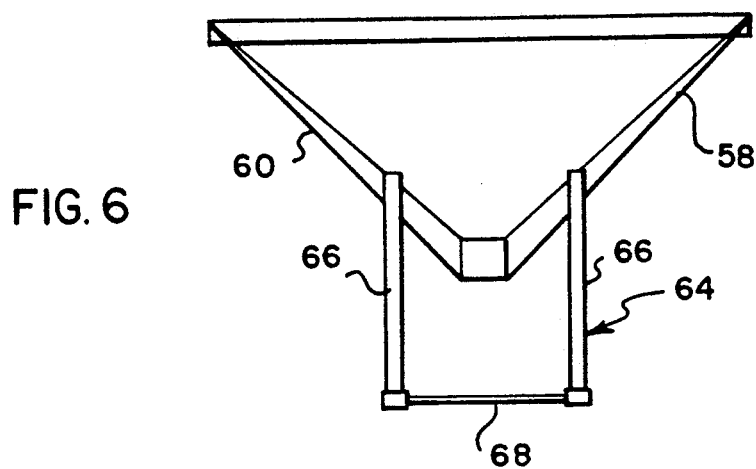
Figure 7:
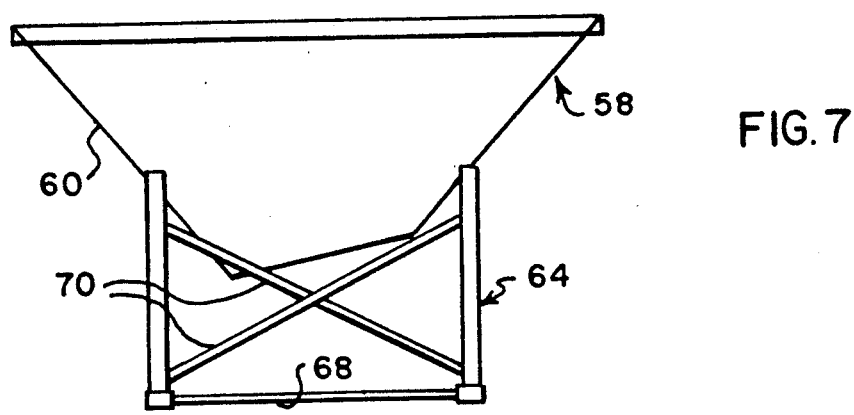
Figure 8:
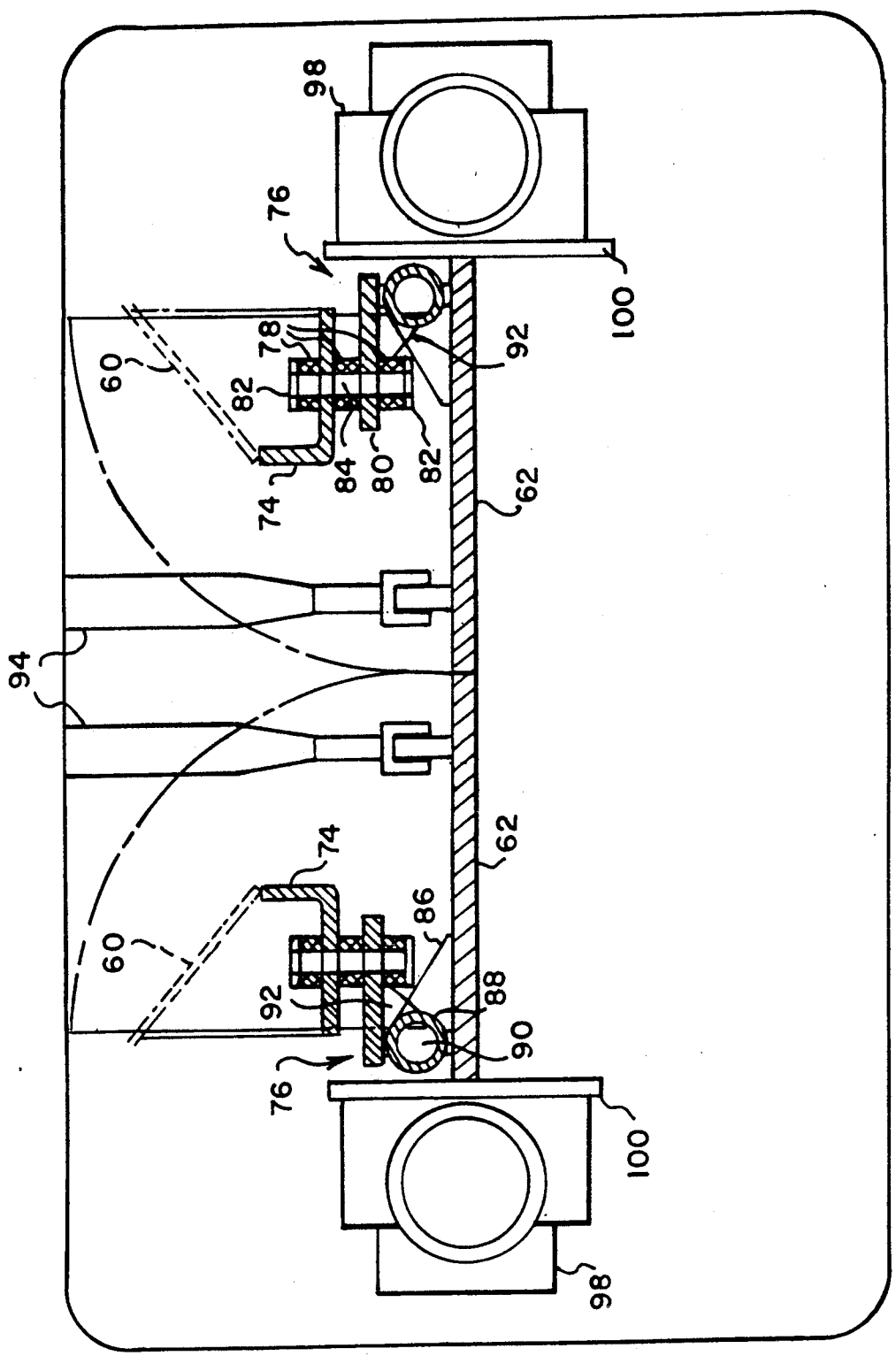
FIG. 8 is a section illustrating the construction of the doors of the hopper of FIGS. 5 to 7.

Turning now to FIGS. 5, 6 and 7, the hopper illustrated is generally designated 58 and comprises an upwardly open funnel 60, which has doors 62 (see FIG. 8) at the lower end thereof. The funnel 60 is supported on a structure designated 64 and which comprises vertical supports 66, horizontal braces 68 and angled braces 70. Wheels 72 (shown in FIG. 9 but not in FIGS. 5 to 7) are provided at the lower ends of the vertical supports 66.

The discharge opening from the hopper (as best seen in FIG. 5) is rectangular in form and approximately four times as long as it is wide. Two angles 74 (see FIG. 8) are secured to the funnel 60 and extend along the longer edges of the discharge opening. A damping structure 76 is provided between each door 62 and the adjacent angle 74. Each damping structure comprises short rubber sleeves 78, which are provided one above the angle 74, one between the angle 74 and a plate 80 and one below the plate 80. Top and bottom bars 82 are drawn together by a bolt 84, thereby to compress the sleeves 78.

Each door 62 is secured by spaced gussets 86 to alternate ones of a series of short co-axial pipe lengths 88. A shaft 90 runs through each of a series of pipe lengths 88. Intervening pipe lengths 88 are secured by gussets 92 to the plate 80. The ends of the shafts 90 are suitably supported by means which are not illustrated.

Straps 94 extend upwardly from each door 62 at each end thereof, the straps 94 being anchored to the structure 64 at their upper ends. Each strap includes a turnbuckle (not shown), which enables the strap lengths to be adjusted and thereby controls the position of each door.

Vibrators generally indicated at 98 are secured to plates 100, which are themselves attached to the doors 62. The damping structures 76 and the straps 94 prevent vibrations being transmitted from the doors to the funnel 60 or the structure 64 which supports the funnel 60.

Figure 9:
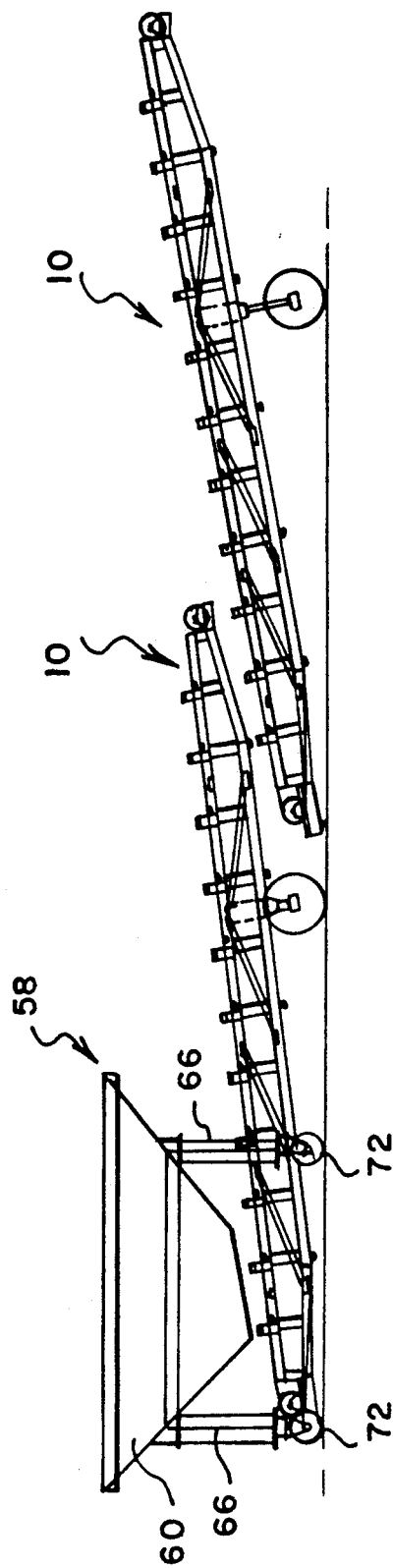
FIG. 9 is a side elevation and illustrates the hopper and two mobile conveyors in their position of use.

Turning now to FIG. 9, a hopper 58 and two mobile conveyors 10 are shown in series. The hopper 58 receives fluent material which is dumped into it by a grab. The fluent material flows from the hopper onto the belt of the left hand mobile conveyor 10, is conveyed upwardly, and is dumped onto the belt of the right hand mobile conveyor 10. It will be understood that as many mobile conveyors 10 as are needed to shift the material from the hopper 58 to the requisite destination are provided.

Figure 10:
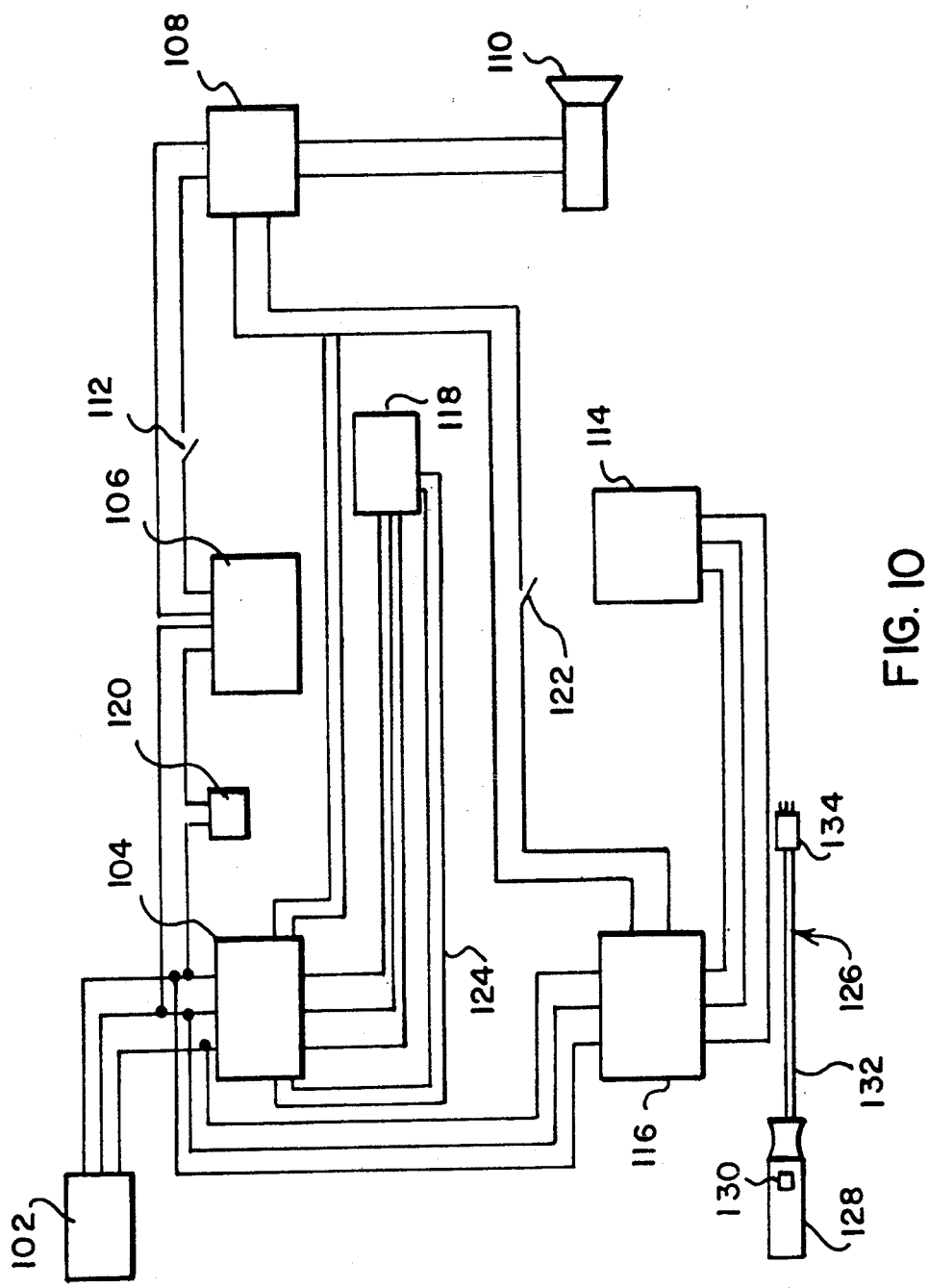
FIG. 10 is a wiring diagram, and FIG. 11 diagrammatically illustrates the discharge of cargo from a ship alongside a wharf.

In the event that it becomes desirable to shut-down the system, either because of a breakage, an accident, or some other emergency situation, a control system linking all the mobile conveyors 10 is provided. This system will be described in more detail with reference to FIG. 10. In FIG. 10 reference numeral 102 designates a power input plug which supplies power to a mains contactor 104. The plug 102 also supplies power to a transformer 106 which supplies a timer 108 and a siren 110. A safety switch 112 operated by a pull cord running the length of the mobile conveyor 10 is provided between the transformer 106 and the timer 108.

The main motor for driving the roller 54 is shown at 114 and is supplied through a contactor 116. The mains contactor 104 also supplies a socket 118 which is at the discharge end of the conveyor 10. The socket 118 is connected to the plug 102 of the next conveyor in the series and power is supplied to the next conveyor through the socket 118. There is a plug 120 between the plug 102 and the transformer 106. As will be described in more detail hereinafter, the plug 120 is normally bridged so that power can reach the transformer 106.

There is a switch 122 between the timer 108 and the contactor 116. This switch, except in the special circumstances described below, is normally closed.

In an installation a number of mobile conveyors are grouped together, one conveyor, the last conveyor in the series, being a master conveyor and, for example, nine other conveyors upstream of the master conveyor being slave conveyors. The slave conveyor which is immediately upstream from the master conveyor receives power for its motor 114 from the master conveyor and the slave conveyors which are upstream of that slave conveyor receive power through the slave conveyor(s) downstream from them.

When power arrives at the plug 102 a timing sequence is initiated and simultaneously the siren 110 sounds to warn that the conveyor belt is about to start.

At the end of its timed period the timer 108 closes both the mains contactor 104 and the motor contactor 116. Power is supplied to the motor 114 and simultaneously power is supplied via the socket 1 1 8 to the adjacent slave conveyor. The sequence just described then commences for the adjacent slave conveyor and for each slave conveyor in turn.

A safety bridge 124 is provided which prevents power reaching the socket 118 unless the power inlet plug 102 of the next conveyor in the series is plugged into it.

As it is impossible to power all the conveyors in a long sequence from a single input plug 102, the number of slave conveyors which receive power from a single master conveyor is limited to, for example, nine. The next conveyor, i.e. the eleventh in the series is another master which receives its power directly from the power supply and not from the adjacent downstream slave conveyor. However, to ensure that the conveyors start in sequence, the next master conveyor is connected to the downstream slave conveyor by a link-over 126 which connects between the socket 118 of the last slave conveyor and the plug 120 of the master conveyor of the next group. When the last slave conveyor is running it signals this fact to the next master conveyor but does not supply power to it. However, it does enable the next master conveyor to receive power and start.

The link-over 126 includes a plug 128 which fits in the socket 1 1 8 and thus disables the safety bridge 124 so that power can reach the socket 1 1 8. It further includes a set of contacts 130, a "no voltage" line 132 and a plug 134 which is inserted into the plug 120. When the power reaches the socket 118 of the last slave conveyor of a series, the contacts 130 close and this completes the circuit of the next master conveyor from the plug 102 to the transformer 106. In the absence of the plug 134, or of a bridging plug, power cannot reach the transformer 106 to commence the timing sequence.

To shut down the entire series of conveyors it is merely necessary to activate the safety switch 112 of the last conveyor in the series. Termination of power to the timer 108 causes the contactors 104 and 116 to open. Opening of the contactor 116 shuts down the motor 114 so that the conveyor stops. Opening of the contactor 104 terminates power supply to the socket 118 and hence to the next slave conveyor whereupon all the slave conveyors in the series stop. When power supply to the socket 118 of the last slave conveyor in a series is interrupted, the contacts 130 open thus breaking the circuit between the plug 102 and the transformer 106 of the next master conveyor. This is equivalent to opening the switch 112. As a consequence, all the conveyors upstream of the one which was initially shut down stop whilst those downstream continue running.

Figure 11:
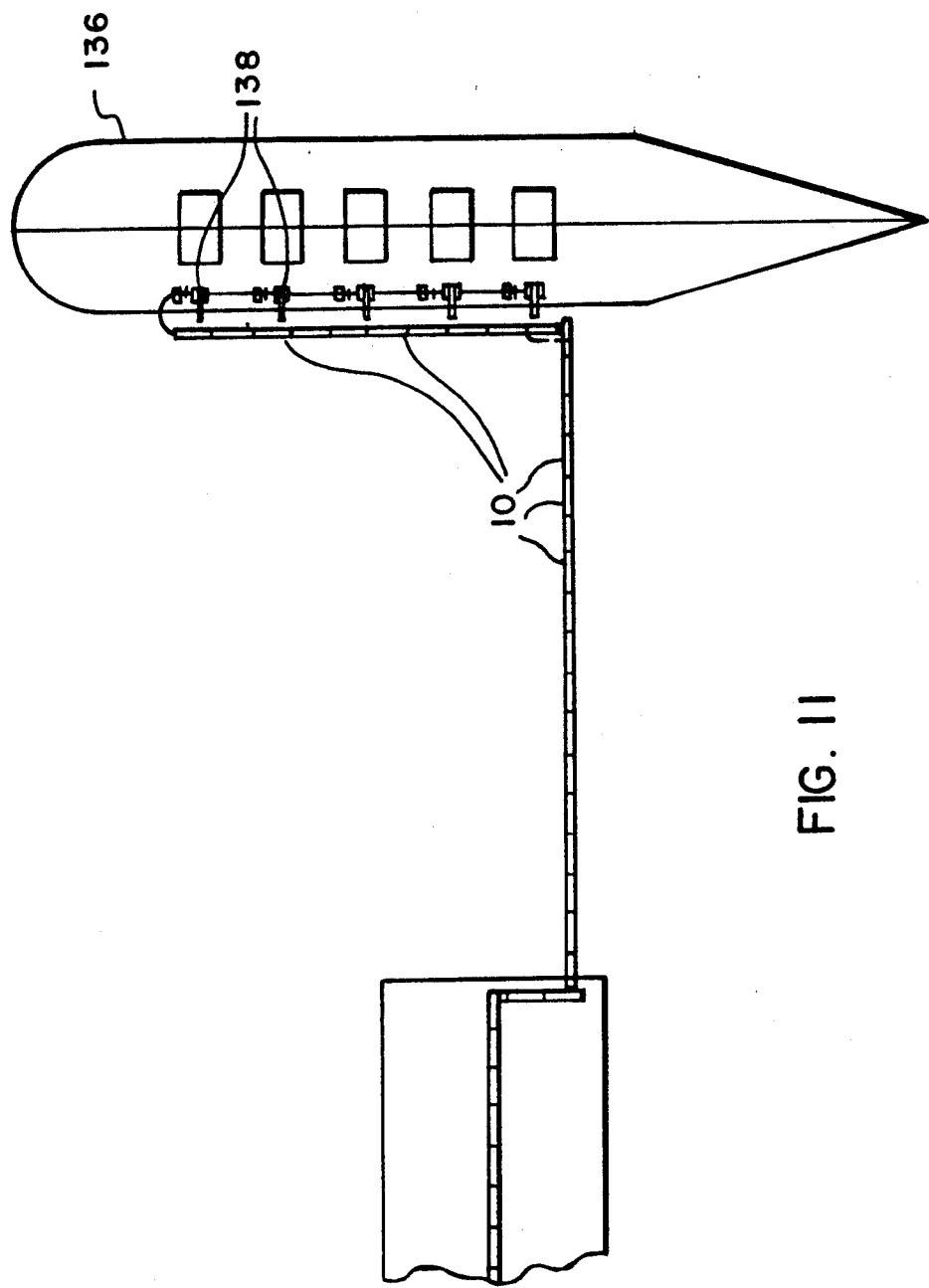

In FIG. 11 there is shown a ship 136 which is being unloaded by five vacuum units 138 which dump onto a series of mobile conveyors 10. It is possible to make the vacuum units part of the sequence described. Preferably the vacuum units are masters in the sense that they have their own power supplies. However, they can only run when the conveyors 10 are in operation and shut-down if the conveyors shut down. Likewise, in FIG. 9, the vibrators 98 of the hopper 58 can be in the sequence. The vibrators 98 each include an electric motor which has its own contactor equivalent to the contactor 116. The timer connects to both contactors. The switch 122 is not required and, as the hopper is the last unit in the entire sequence, all those parts of the circuit which are required to feed power to an upstream unit, e.g. the link-over 126 and the plug 118 are omitted.

It is possible to suspend the series of mobile conveyors from the roof or some other overhead structure of a storage building. In FIG. 1 lines 140 indicate where suspension chains can be provided. The fluent material to be stored is fed from inclined conveyor belt to inclined conveyor belt and discharged from the last one so that it falls to the floor. By shutting down the last conveyor of the sequence, material which is fed off the second to last conveyor onto the last conveyor piles up until it falls-off what would normally be the loading end of said last conveyor. This is achieved by opening the switch 122 to disable the motor 114. Opening the switch 122 leaves the remainder of the circuit in its operative condition so that other conveyors do not switch-off in series. As each conveyor is switched off in turn, the point at which the fluent material is being discharged moves across the building.

Each conveyor belt preferably comprises a single length of belting material formed into an endless loop. However, the belt can comprise individual stats joined to form an endless loop or be of any other suitable endless construction.

We claim:

1. A conveyor system including first and second conveyors, each conveyor including a conveyor belt and an electric motor for driving the belt, said first conveyor having a power inlet and a power outlet, said power inlet being for connection to a power supply, power connecting means for connecting said motor of said first conveyor and said power outlet of the first conveyor to said power inlet of the first conveyor, said first conveyor further comprising a timer which commences a timing sequence when power is supplied to said power inlet of said first conveyor, said power connecting means being closed at the end of said timing sequence to supply power to said motor of said first conveyor and to said power outlet of said first conveyor, the second conveyor having a motor, a power inlet and a power outlet, the power inlet of the second conveyor being connected to the power outlet of the first conveyor whereby power reaches the power inlet of the second conveyor through the power outlet of the first conveyor after a delay the period of which is determined by said timer, and said second conveyor further comprising a timer which commences a further timing sequence when power is supplied to said power inlet of said second conveyor from the power outlet of the first conveyor, and power connecting means which closes at the end of said further timing sequence to connect said motor of said second conveyor and said power outlet of said second conveyor to the power inlet of the second conveyor.

2. A system according to claim 1 in which said power connecting means of the second conveyor comprises a first power connecting means between said power inlet of the second conveyor and the motor of said second conveyor and a second power connecting means between said power inlet of the second conveyor and said power outlet of the second conveyor.

3. A system according to claim 1 in which said power connecting means of said first conveyor comprises a first power connecting means between said power inlet and said motor of said first conveyor and a second power connecting means between said power inlet and said power outlet of said first conveyor.

4. A system according to claim 3 in which each conveyor comprises means for opening said first power connecting means thereof independently of said second power connecting means thereof.

5. A system according to claim 4 and in which each conveyor comprises further means for simultaneously opening both said power connecting means thereby to stop the motor of that conveyor and to interrupt the power supply to said power outlet of that conveyor.

6. A system according to claim 1 and comprising means for preventing power reaching said power outlet of said first conveyor unless the power inlet of said second conveyor is connected to said power outlet of said first conveyor.

7. A system according to claim 1 and including a plurality of further second conveyors, each of which has a power inlet thereof connected to a power outlet of another of the second conveyors of the system.

8. A system according to claim 7 in which the last of the second conveyors of said plurality is connected to a further first conveyor which itself has a power inlet for connection to said power supply, the power outlet of said last of said second conveyors being connected to said further first conveyor by a link which when in place completes the circuit from the power inlet of said further first conveyor to the timer thereof only when power reaches said power outlet of said last of said second conveyors.

9. A system according to claim 8 in which said link includes contacts which are in said circuit when said link is in position and which contacts close when power reaches said power outlet of said last of said second conveyors.

10. A conveyor system including a first conveyor and a plurality of second conveyors, each conveyor including a conveyor belt and an electric motor for driving the belt, said first conveyor having a power inlet for connecting said motor of said first conveyor to a power supply and also having a power outlet, each second conveyor having a power inlet and a power outlet, said power inlet of the first of said second conveyors in the system being connected to said power outlet of said first conveyor and the power inlets and outlets of said second conveyors being connected to one another so that power is supplied to all said second conveyors through said first conveyor, each of said conveyors having a first power connecting means between the power inlet thereof and the motor thereof and a second power connecting means between the power inlet thereof and the power outlet thereof, and means for disabling said first power connecting means independently of said second power connecting means whereby any conveyor can be stopped without interrupting power supply to the other conveyors of the system.

* * * * *